UNITED STATES PATENT OFFICE.

SAMUEL FRAZER, OF GALENA, ILLINOIS.

LUBRICANT.

SPECIFICATION forming part of Letters Patent No. 233,497, dated October 19, 1880.

Application filed August 19, 1880. (No specimen.)

*To all whom it may concern:*

Be it known that I, SAMUEL FRAZER, of Galena, in the county of Jo Daviess, and in the State of Illinois, have invented certain new and useful Improvements in Lubricants; and I do hereby declare that the following is a full, clear, and exact description thereof.

The nature of my invention consists in a composition for axle-grease, composed of sal-soda, water, lime, and four qualities of rosin-oil, designated as Nos. 1, 2, 3, and 4, as will be hereinafter more fully set forth.

Letters Patent were granted to me September 9, 1879, No. 219,455, for an improvement in lubricants, which covered a composition consisting of sal-soda, water, lime, and the four qualities of rosin-oil known as Nos. 1, 2, 3, and 4; but the said qualities or grades of rosin-oil were produced by a process described in Letters Patent No. 28,663, granted January 12, 1860, and are essentially different from those produced by the process hereinafter described, and used in making the composition now claimed.

The different qualities of oil used by me in my composition for axle-grease are made as follows: I place, say, about four hundred pounds of crude rosin in a boiler and apply heat thereto. When the rosin is melted and done rising the cover of the boiler is screwed on and luted with a luting of salt and lime. The vapor then forming in the boiler passes into a condenser, and thence in a liquid state into a receiver, any gas escaping being carried off by a suitable outlet-pipe. The first liquid that passes off from the receiver through a suitable stop-cock is spirits of rosin, which is rough to the touch and gives no indications of the presence of oil. When about nine quarts of the spirits have thus passed off oil will appear, when the stop-cock must be closed, and the oil will be discharged through a siphon-tube, the temperature of the oil as it leaves the siphon being about 86° Fahrenheit. When about four and a half gallons of oil have passed off at this temperature it must be raised to 100° Fahrenheit, at which temperature ten gallons are to be drawn off. Then increase the temperature to 110° Fahrenheit and draw off fourteen gallons of oil. The temperature must now be reduced to 100° Fahrenheit and seven and a half gallons are drawn off. The oils thus separately drawn off at the several above temperatures are rosin-oils designated as Nos. 1, 2, 3, and 4, respectively.

These different oils I use to form my axle-grease in the following manner: I first dissolve one-half pound of sal-soda in three pints of water and mix the same with one-half gallon No. 1 rosin-oil and two and a half gallons No. 4 rosin-oil. These are then stirred together, after which ten pounds of fine sifted lime are added and stirred, when it is allowed to stand for about six hours, so that the sediment or foreign matter will settle to the bottom. I then mix one gallon No. 1 rosin-oil, three and a half gallons No. 2 rosin-oil, and four and two-thirds gallons No. 3 rosin-oil, which are placed in a keg or other vessel, after which the first mixture above described is poured off into such vessel and the whole thoroughly stirred, when the axle-grease is completed.

Having thus fully described my invention, what I claim as new, and desire to secure by Letters Patent, is—

The compound for axle-grease herein described, composed of sal-soda, water, lime, and the four qualities of rosin-oil herein designated as Nos. 1, 2, 3, and 4, substantially as set forth.

In testimony that I claim the foregoing I have hereunto set my hand and seal this 31st day of July, A. D. 1880.

SAMUEL FRAZER. [L. S.]

Witnesses:
THOS. J. SHEEAN,
WILLIAM D. MCHUGH.